(12) United States Patent
Deng (10) Patent No.: US 12,430,936 B2
(45) Date of Patent: Sep. 30, 2025

(54) TEXT IMAGE CORRECTION METHOD AND APPARATUS

(71) Applicant: CIENET TECHNOLOGIES (BEIJING) CO., LTD., Beijing (CN)

(72) Inventor: Yuance Deng, Beijing (CN)

(73) Assignee: CIENET TECHNOLOGIES (BEIJING) CO., LTD., Beijing (CN)

( * ) Notice: Subject to any disclaimer, the term of this patent is extended or adjusted under 35 U.S.C. 154(b) by 314 days.

(21) Appl. No.: 18/317,026

(22) Filed: May 12, 2023

(65) Prior Publication Data

US 2024/0161523 A1  May 16, 2024

Related U.S. Application Data

(63) Continuation of application No. PCT/CN2021/130369, filed on Nov. 12, 2021.

(51) Int. Cl.
*G06V 30/146* (2022.01)
*G06V 10/24* (2022.01)

(52) U.S. Cl.
CPC ........ *G06V 30/1478* (2022.01); *G06V 10/242* (2022.01)

(58) Field of Classification Search
CPC ................. G06V 30/146–1478; G06V 10/242
See application file for complete search history.

(56) References Cited

U.S. PATENT DOCUMENTS

| | | | |
|---|---|---|---|
| 7,065,261 B1* | 6/2006 | Horie ................... | H04N 5/2628 382/296 |
| 2002/0051575 A1* | 5/2002 | Myers ................... | G06V 20/63 382/202 |
| 2005/0180632 A1* | 8/2005 | Aradhye ................ | G06V 20/63 382/182 |
| 2021/0124979 A1* | 4/2021 | Andreotti .................. | G06T 5/70 |

* cited by examiner

*Primary Examiner* — Sean T Motsinger
(74) *Attorney, Agent, or Firm* — George Guosheng Wang; Upstream Research and Patent LLC (57) ABSTRACT

A text image correction method and a corresponding text image correction apparatus. Frequency information of a row-direction cumulative curve used by the method is sensitive to an error between a compensation angle for a tilt angle and a real tilt angle, and the method thus has good robustness. The method can accurately estimate the compensation angle for a tilt angle and correct a tilted text image. The method and apparatus can be applied to scenarios such as image pre-processing, automatic compensation for angles of scanned text images, automatic compensation for tilt angles of mobile phone photos.

10 Claims, 11 Drawing Sheets

In Times of Trouble by Clay Harrison
困境之时——克雷·哈里森

Often in times of trouble, we don't know what to say
身处困境之时，往往不知如何言对

So we choose to say nothing, and sometimes run away
因此我们选择沉默，有时候逃避

When friends are really hurting, we don't know what to do
朋友痛苦之时，我们不知如何是好

So we offer weak excuses or say we're hurting too
所以我们找借口推托，或者借口自己也遭受困苦

It really doesn't matter what kind of gift we bring
我们带什么礼物其实不重要

We only need to be there if we don't bring a thing
重要的是人要到场

It truly is amazing what a hug can do
拥抱的神奇功效令人惊叹

When heartache numbs the senses, and friends depend on you
当心痛麻木了一切知觉，朋友依赖于你

There's comfort just in knowing that you are not alone
只需知道你并不孤单，就会有所慰藉

When tears are overflowing, and hearts are cold as stone
当泪水漫溢，心如冰石

It's the loving prayers of others that balance our accounts
是他人的爱和祈祷，平衡了我们的账户

For when we measure love, it's still the thought that counts
当我们衡量爱时，心意仍是最重要的

TEXT IMAGE CORRECTION METHOD AND APPARATUS

BACKGROUND

Technical Field

The present disclosure relates to a text image correction method and a corresponding text image correction apparatus, and belongs to the technical field of image correction.

Related Art

With the development of a digital technology and the popularization of a digital office system, people often use mobile phones to photograph paper documents, share photographed document pictures directly with others, or upload the pictures to a service system for further automatic verification, recognition, and other subsequent processing in work or daily life. By photographing and sharing the documents, it is more convenient for people's lives and more simplified and intelligent for service handling.

However, in the process of photographing the paper documents, it is likely to skew text in photographed document pictures because of human or non-human causes. The document pictures with the skewed text will affect the reading effect after printing, or will be difficult to process subsequently after being uploaded to the service system, or cannot even be verified and recognized at all.

SUMMARY

The primary technical problem to be solved by the present disclosure is to provide a text image correction method.

Another technical problem to be solved by the present disclosure is to provide a text image correction apparatus.

In order to achieve the above object, the present disclosure adopts the following technical solution.

According to a first aspect of this embodiment of the present disclosure, a text image correction method is provided, which includes the following steps:
  preprocessing to-be-corrected images into binary images;
  sequentially rotating the binary images in the same direction with a predetermined step size, recording a cumulative rotation angle upon each rotation, and calculating a row cumulant of a current binary image until the current binary image is rotated to a threshold angle;
  extracting a frequency satisfying preset conditions for the row cumulant of each binary image; and
  correcting the to-be-corrected images by using the cumulative rotation angle corresponding to the maximum frequency among the frequencies of the binary images satisfying the preset conditions as a compensation angle.

Preferably, the preprocessing to-be-corrected images into binary images specifically includes:
  converting the to-be-corrected images into grayscale images; and
  converting the grayscale images into the binary images based on a maximum between-class variance method.

Preferably, the calculating a row cumulant of the current binary image specifically includes:
  calculating a row cumulant of each row for the current binary image; and
  sequentially constructing the row cumulant of each row into, a column vector $S^t$ as the row cumulant of the current binary image.

A calculation formula for the row cumulant of each row is:

$$s_i^t = \sum_j d_{(i,j)}^t$$

where $s_i^t$ is a row cumulant of an $i^{th}$ row of a current binary image $D^t$, and $d_{(i,j)}^t$ is an element in the $i^{th}$ row and $j^{th}$ column of the current binary image $D^t$.

Preferably, the extracting a frequency satisfying preset conditions for the row cumulant of each binary image specifically includes:
  performing sliding window smoothing filtering on the row curt lain of the current binary image to obtain a corresponding filtering sequence $Q^t$;
  performing mean subtraction processing on the filtering sequence $Q^t$ to obtain a corresponding mean-subtracted sequence $H^t$;
  performing spectral analysis on the mean-subtracted sequence $H^t$ to obtain a discrete sequence $P^t$; and
  extracting a frequency $f^t$ satisfying the preset conditions from the discrete sequence $P^t$.

Preferably, a calculation formula for the filtering sequence $Q^t$ is:

$$q_i^t = \frac{1}{L} \sum_{j=0}^{L} s_{i+j}^t$$

where $q_i^t$ is an $i^{th}$ element of $Q^t$, L is a width of a sliding window, and $s_{i+j}^t$ is a row cumulant of an $(i+j)^{th}$ row in the current binary image $D^t$.

Preferably, a calculation formula for the mean-subtracted sequence $H^t$ is:

$$h_i^t = q_i^t - M(Q^t)$$

where $h_i^t$ is an $i^{th}$ element of the mean-subtracted sequence $H^t$, and $M(*)$ represents calculation of a mean of an input sequence.

Preferably, a calculation formula for the discrete sequence $P^t$ is:

$$p_k^t = \sum_{j=0}^{N-1} h_j^t * e^{-\frac{2\pi i}{N} kj} \quad k = 0, \ldots, N-1$$

where $h_j^t$ is the $i^{th}$ element of the mean-subtracted sequence $H^t$, $p_k^t$ is a $k^{th}$ element of the discrete sequence $P^t$, and N is a minimum power of 2 greater than a length of the sequence $H^t$.

Preferably, a calculation formula for the frequency $f^t$ satisfying the preset conditions is;

$$f^t = \frac{F_s}{2N} k \quad \text{s.t.} \quad p_k^t \geq \varphi^* M(P^t)$$

where Fs is a sampling rate of the row cumulant of the current binary image, and φ is a configurable system parameter.

Preferably, a calculation formula for sequentially rotating the binary images in the same direction is:

$$\begin{cases} d_{(x,y)}^t = d_{(i,j)}^b \\ x = \langle \cos\theta_t * i + \sin\theta_t * j \rangle \\ y = \langle -\sin\theta_t * i + \cos\theta_t * j \rangle \end{cases}$$

where $d_{(x,y)}^t$ is an element of a rotated binary image in an $x^{th}$ row and a $y^{th}$ column, $\theta_t$ is a rotation angle of the rotated binary image, $d_{(i,j)}^b$ is an element of an unrotated binary image in an $i^{th}$ row and $j^{th}$ column, and (*) represents rounding a result.

According to a second aspect of this embodiment of the present disclosure, a text image correction apparatus is provided, which includes: a processor and a memory. The processor reads a computer program in the memory to perform the following operations:

preprocessing to-be-corrected images into binary images;
sequentially rotating the binary images in the same direction with a predetermined step size, recording a cumulative rotation angle upon each rotation, and calculating a row cumulant of a current binary image until the current binary image is rotated to a threshold angle;
extracting a frequency satisfying preset conditions for the row cumulant of each binary image; and
correcting the to-be-corrected images by using the cumulative rotation angle corresponding to the maximum frequency among the frequencies of the binary images satisfying the preset conditions as a compensation angle.

Compared with the related art, the text image correction method and the text image correction apparatus provided by the present disclosure may estimate the compensation angle of the skew angle more accurately, and may correct skewed text and pictures. The text image correction method and the text image correction apparatus of the present disclosure may be applied to image preprocessing, automatic angle compensation for scanned text and images, automatic compensation for phone camera skew angles, and other scenarios.

DETAILED DESCRIPTION

The Summary section of the present disclosure will be described in detail with reference to the accompanying drawings and specific embodiments.

Figure 1:
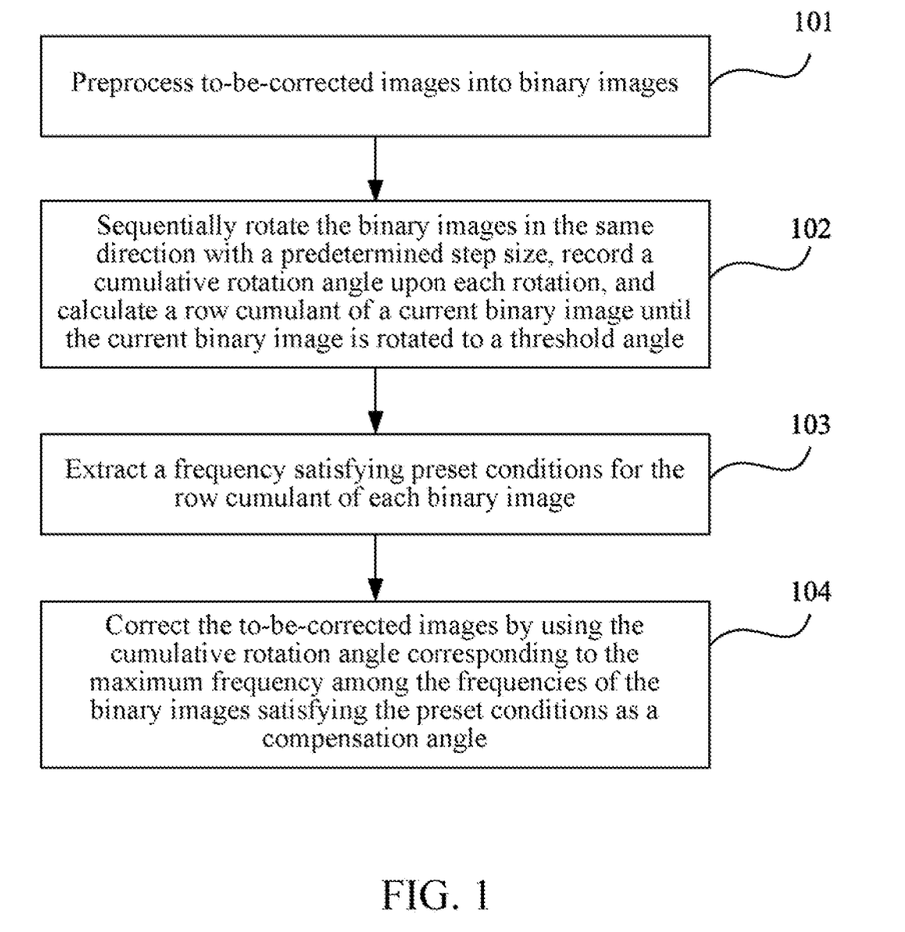
FIG. 1 is a flowchart of a text image correction method according to an embodiment of the present disclosure.

As shown in FIG. 1, a text image correction method provided in this embodiment of the present disclosure mainly includes the following steps:

101: Preprocess to-be-corrected images into binary images. Specifically:

1011: Convert the to-be-corrected images into grayscale images.

Figure 2:
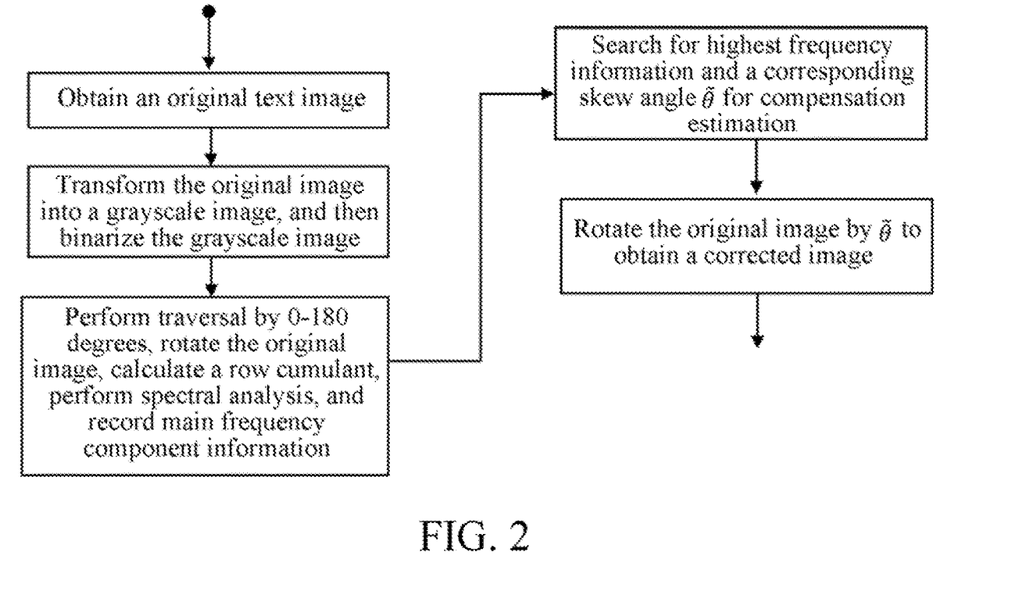
FIG. 2 is a schematic flowchart of an image correction process in an embodiment of the present disclosure.

As shown in FIG. 2, a to-be-corrected image (original text image) $D^o$ is read. A dimension of a data matrix. $D^o$ corresponding to a digital image is set to m×n×3, where m and n are the number of pixel points corresponding to a height and width of the to-be-corrected image $D^o$, respectively.

In general, the to-be-corrected image $D^o$ is colored, which is represented by data of three color channels of r/g/b having dimensions of m×n.

The to-be-corrected image $D^o$ is converted into a grayscale image $D^g$ according to the following formula:

$$D^g = 0.2989*R + 0.5870*G + 0.1140*B \tag{1}$$

In Formula (1), R/G/B represent red, green, and blue components in the original color image $D^o$, respectively, and relationships between values of elements of a matrix and the original color image are as follows:

$$\begin{cases} r_{(i,j)} = D^o(i, j, 1) \\ g_{(i,j)} = D^o(i, j, 2) \\ b_{(i,j)} = D^o(i, j, 3) \end{cases} \tag{2}$$

In Formula (2), $r_{(i,j)}$, $g_{(i,j)}$, and $b_{(i,j)}$ represent elements of an $i^{th}$ row and a $j^{th}$ column in the R/G/B matrix, respectively.

1012: Convert the grayscale images into the binary images based on a maximum between-class variance method.

After obtaining the grayscale image $D^g$, in order to eliminate the influence of background light of a photographing environment on the determination of a text area, a suitable threshold T is further calculated using a maximum between-class variance method, and then converted into a binary image $D^b$ according to the following formula expressed:

$$d_{(i,j)}^b = \begin{cases} 0 & d_{(i,j)}^g \leq T \\ 1 & d_{(i,j)}^g > T \end{cases} \tag{3}$$

In Formula (3), $d_{(i,j)}{}^g$ and $d_{(i,j)}{}^b$ represent elements of an $i^{th}$ and a $j^{th}$ column of $D^g$ and $D^b$, respectively.

The maximum between class variance method, also referred to as an Ostu method, is a classical and commonly used threshold selection algorithm. The method realizes automatic selection of a global threshold T by the statistics of histogram characteristics of the whole image, and includes the following algorithm steps:

Step 1: Calculate a histogram of an image: statistically obtaining the number of pixels falling on each bin among 256 bins (0-255) of all pixel points of the image.

Step 2: Normalize the histogram: dividing the number of pixels in each bin by the total number of pixels.

Step 3: Start iteration from 0, where i represents a threshold of classification, namely a gray level.

Step 4: Statistically obtain a ratio w0 of pixels (pixels having pixel values within this range are referred to as foreground pixels) with gray levels of 0-i to the whole image through the normalized histogram and statistically obtain an average grayscale u0 of the foreground pixels, statistically obtain a ratio w1 of pixels (pixels having pixel values within this range are referred to as background pixels) with gray levels of i-255 to the whole image and statistically obtain an average grayscale u1 of the background pixels, Step 5: Calculate a variance of the foreground pixels and the background pixels g=w0*w1*(u0−u1)(u0−u1).

Step 6: Turn i++ to 4, and end iteration when i is 256.

Step 7: Take an i value corresponding, to maximum g as a global threshold of the image.

102: Sequentially rotate the binary images in the same direction with a predetermined step size, record a cumulative rotation angle upon each rotation, and calculate a row cumulant of a current binary image until the current binary image is rotated to a threshold angle.

In order to extract distribution information of image text and blank space under different rotation angles, the binary image $D^b$ is required to be ergodically rotated by a certain angle, the dimension of two-dimensional information is reduced to one-dimensional space by calculating a row cumulant, and then a plurality of strong frequency components are extracted by performing spectral analysis on the row cumulant and stored for subsequent analysis.

Figure 3:
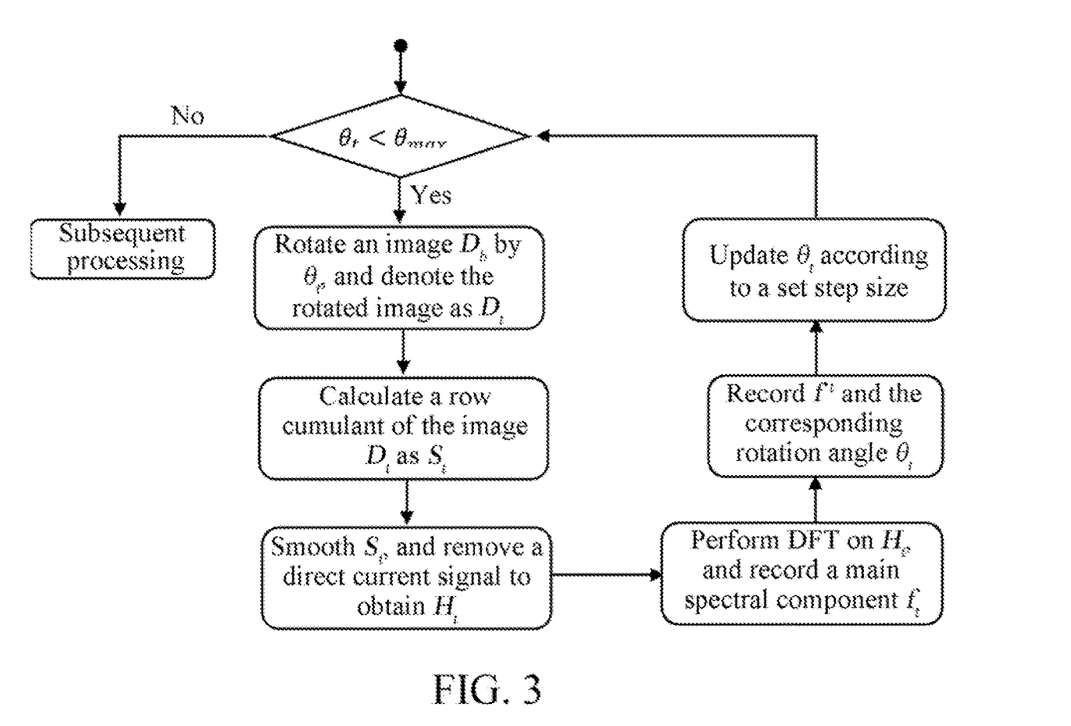
FIG. 3 is a schematic flowchart of extracting a frequency of a row cumulant of a binary image in an embodiment of the present disclosure.

As shown in FIG. 3, the binary image $D^b$ is sequentially rotated in the same direction with an angle $\theta_\Delta$ as a step size, whereby a cumulative rotation angle $\theta_t$ of the binary image $D^b$ is increased from 0 degrees to $\theta_{max}$. $\theta_\Delta$ and $\theta_{max}$ are configurable algorithm parameters. In this embodiment, $\theta_\Delta$ is 0.5 degrees, and $\theta_{max}$ is 180 degrees.

In one embodiment of the present disclosure, the same direction is clockwise or counterclockwise. Since the to-be-corrected image $D^o$ is skewed clockwise or counterclockwise, there will always be a unique angle corresponding to the horizontal text in the image in the process of sequentially rotating in a certain direction by 180 degrees.

In one embodiment of the present disclosure, the step size $\theta_\Delta$ determines the accuracy of skew angle estimation, determines the size of system errors, and also affects the calculation complexity and delay of the whole algorithm. Assuming that the cumulative rotation angle of the binary image $D^b$ is $\theta_t$ (increased from 0 degrees to $\theta_t$ by 0.5 degrees each time), the current rotated image is $D^t$, and the rotation process is:

$$\begin{cases} d^t_{(x,y)} = d^b_{(i,j)} \\ x = \langle \cos\theta_t * i + \sin\theta_t * j \rangle \\ y = \langle -\sin\theta_t * i + \cos\theta_t * j \rangle \end{cases} \quad (4)$$

In Formula (4), $d_{(x,y)}{}^t$ is an element of a rotated binary image in an $x^{th}$ row and a $y^{th}$ column, $\theta_t$ is a rotation angle of the rotated binary image, $d_{(i,j)}{}^b$ is an element of an unrotated binary image in an $i^{th}$ row and $j^{th}$ column, and $\langle * \rangle$ represents rounding a result.

After the rotated binary image is obtained, a row cumulant of the image may be calculated as $S^t$.

1021: Calculate a row cumulant of each row for the current binary image.

A calculation formula for the row cumulant of each row is:

$$s_i^t = \Sigma_j d_{(i,j)}^t \quad (5)$$

In Formula (5), $s_i^t$ is a row cumulant of an $i^{th}$ row of a current binary image $D^t$, and $d_{i,j}{}^t$ is an element in the $i^{th}$ row and $j^{th}$ column of the current binary image $D^t$.

1022: Sequentially construct the row cumulant of each row into a column vector $S^t$ as the row cumulant of the current binary image.

Figure 4C:
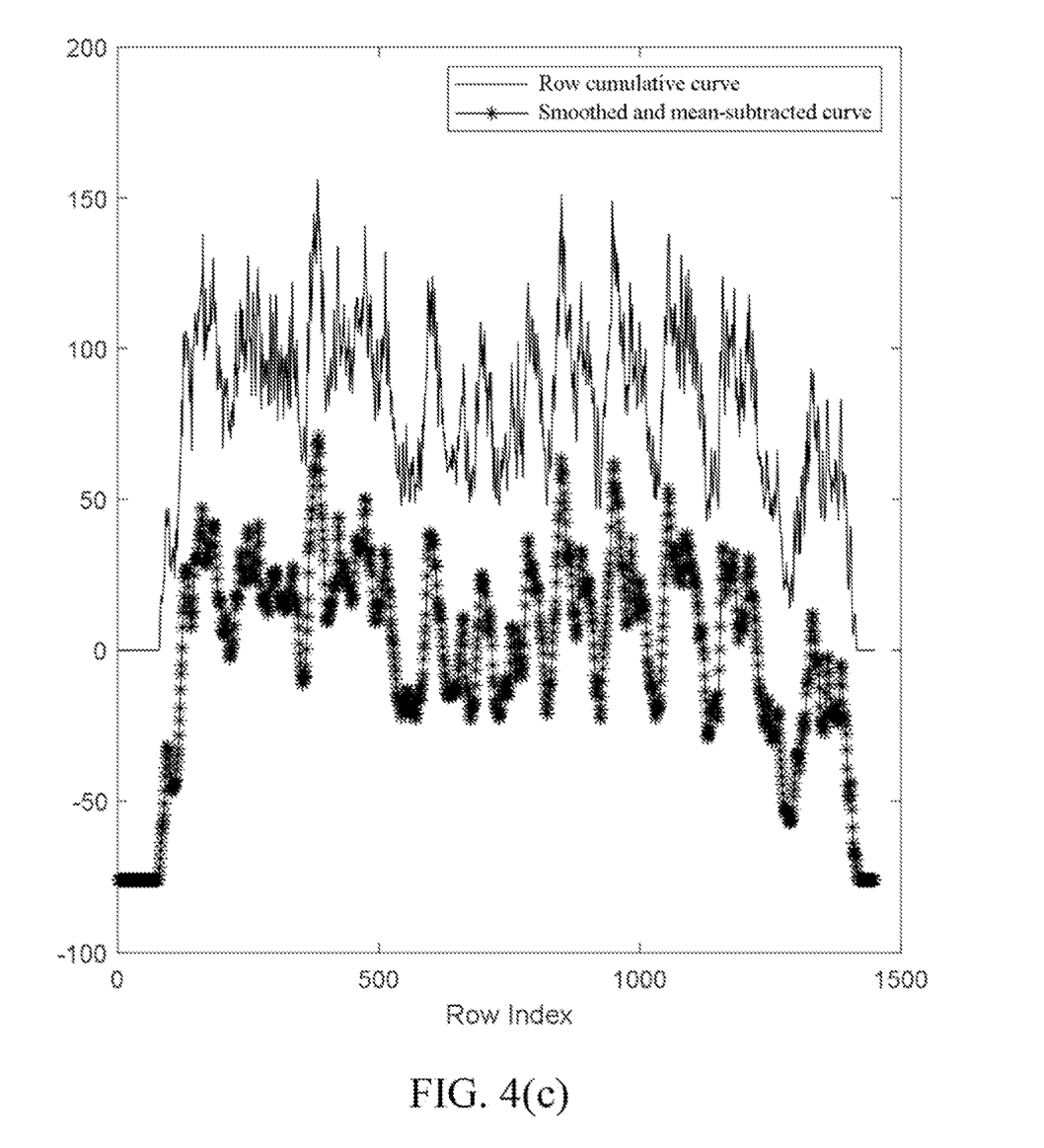
FIG. 4(c) shows a variation curve of a row cumulative variable of a binary image rotated by 0.5 degrees in an embodiment of the present disclosure.

It is assumed that in one embodiment of the present disclosure, the to-be-corrected image $D^o$ is skewed clockwise by 8.5 degrees. When the corresponding binary image $D^b$ is rotated counterclockwise by 0.5 degrees, that is, $\theta_r=0.5$ degrees, a variation curve of a row cumulative variable of the binary image $D^b$ is shown in FIG. 4(c). When $\theta_r=8.5$ degrees, the variation curve of the row cumulative variable of the binary image $D^b$ is shown in FIG. 5(c). When $\theta_r=69.5$ degrees, the variation curve of the row cumulative variable of the binary image $D^b$ is shown in FIG. 6(c). When $\theta_r=0.5$ degrees, $\theta_r=8.5$ degrees, and $\theta_r=69.5$ degrees, the corresponding $S^t$ is obtained by column sampling of the binary image $D^b$ at the same sampling rate $F_s$, it can be seen from the corresponding variation curve of the row cumulative variable that the variation curve of the row cumulative variable of the binary image changes obviously under different rotation angles. When the cumulative rotation angle $\theta_t$ is equal to or close to a true skew angle of 8.5 degrees, the variation MVO of the row cumulative variable of the binary image is uniformly distributed, and the corresponding frequency value increases obviously. Therefore, it is possible to determine whether the text is horizontal or not from the law of the variation curve of the row cumulative variable of the binary image.

103: Extract a frequency satisfying preset conditions for the row cumulant of each binary image. Specifically:

1031: Perform sliding, window smoothing filtering on the row cumulant of the current binary image to obtain a corresponding tittering sequence $Q^t$.

As shown in FIG. 3, in order to prevent the influence of image noise, the row cumulative variable $S^t$ of the current binary image $D^b$ is subjected to sliding window smoothing filtering to remove some burrs and obtain the corresponding filtering sequence $Q^t$. A calculation formula for the filtering sequence $Q^t$ is:

$$q_i^t = \frac{1}{L}\sum_{j=0}^{L} s_{i+j}^t \quad (6)$$

In Formula (6), $Q^t$ is an $i^{th}$ element of $q_i^t$, L is a width of a sliding window, and $s_{i+j}{}^t$ is a row cumulant of an $(i+j)^{th}$ row in the current binary image $D^t$.

In one embodiment of the present disclosure, when the sliding window exceeds an actual length of $S^t$, an invalid element in the window defaults to 0.

1032: Perform mean subtraction processing on the filtering sequence $Q^t$ to obtain a corresponding mean-subtracted sequence $H^t$.

In order to prevent the influence of a direct current signal on the subsequent frequency analysis, mean subtraction processing is performed on the filtering sequence $Q^t$. A calculation formula for the mean-subtracted sequence $H^t$ is:

$$h_i^t = q_i^t - M(Q^t) \quad (7)$$

In Formula (7), $h_i^t$ is an $i^{th}$ element of the mean-subtracted sequence $H^t$, and $M(*)$ represents calculation of a mean of an input sequence.

1033: Perform spectral analysis on the mean-subtracted sequence $H^t$ to obtain a discrete sequence $P^t$.

DFT spectral analysis is performed on the mean-subtracted sequence $H^t$. A calculation formula for the discrete sequence $P^t$ is:

$$p_k^t = \sum_{j=0}^{N-1} h_j^t * e^{-\frac{2\pi i}{N} kj} \quad k = 0, \ldots, N-1 \quad (8)$$

In Formula (8), $h_j^t$ is the $i^{th}$ element of the mean-subtracted sequence $H^t$, $p_k^t$ is a $k^{th}$ element of the discrete sequence $P^t$, and N is a minimum power of 2 greater than a length of the sequence $H^t$.

In one embodiment of the present disclosure, the discrete sequence $P^t$ describes the magnitude of contribution of different frequency components to the mean-subtracted sequence $H^t$, corresponding to the magnitude of the probability of regular distribution between text and blank space in the current binary image $D^t$. Then, by frequency analysis on $S^t$, variation law information of text and blank space in the binary image $D^t$ in the row direction with the variation of the cumulative rotation angle may be obtained, as shown in FIG. 4(c) to FIG. 6(c).

1034: Extract a frequency $f^t$ satisfying the preset conditions from the discrete sequence $P^t$.

The main frequency components in $P^t$ are extracted. As shown in Formula (9), k satisfying the conditions is found and then converted into the corresponding frequency, $f^t$ satisfying the conditions is found to form an output vector $F^t$.

A calculation formula for the frequency $f^t$ satisfying the preset conditions is:

$$f^t = \frac{F_s}{2N} k \text{ s.t. } p_k^t \geq \varphi^* M(P^t) \quad (9)$$

In Formula (9), Fs is a sampling rate of the row cumulant of the current binary image, and $\varphi$ is a configurable system parameter. In one embodiment of the present disclosure, the sampling rate Fs is an algorithm parameter with a value of 50 Hz, $\varphi$ is mainly used for determining a standard for the magnitude of frequency contribution, and has a value of 15. If $\varphi$ is too small, the frequency components of misjudgment will be increased. On the contrary, if it is too large, information frequency components may be missed. The best effect should be that one to two frequency components with obvious greater contribution may be selected in each rotation.

After extracting the frequency of the current binary image $D^t$ satisfying the preset conditions, the frequency satisfying the preset conditions is associated with the cumulative rotation angle $\theta_t$ recorded correspondingly. Then, $\theta_t$ is updated according to the step size $\theta_\Delta$:

$$\theta_t := \theta_t + \theta_t \quad (10)$$

The extraction and calculation process corresponding to the next binary image $D^t$ is entered, and ends when $\theta_t = 180$ degrees.

104: Correct the to-be-corrected images by using the cumulative rotation angle corresponding to the maximum frequency among the frequencies of the binary images satisfying the preset conditions as a compensation angle.

Ideally, if the text in the binary image is not skewed, the corresponding row cumulative curve of the image should oscillate according to the law of FIG. 5(c) and has good frequency characteristics. On the contrary, if the frequency information of the row cumulative curve of the image may be extracted under different rotation angles, the skew angle of the text may also be estimated.

A frequency component sequence ° F. is formed by splicing the output vector $F^t$ of each binary image end to end. The highest frequency is searched from each element of ° F. Then, the cumulative rotation angle corresponding to the highest frequency is obtained from the recorded cumulative rotation angles as a compensation angle:

$$\tilde{\theta} = \arg\max_{\theta_t}(\tilde{f}) \text{ s.t. } \tilde{f} = \max(° F.) \quad (11)$$

After obtaining the compensation angle $\tilde{\theta}$, the binary image $D^b$ before rotation is rotated by $\tilde{\theta}$ to output a corrected binary image $\tilde{D}^b$:

$$\begin{cases} \tilde{d}_{(x,y)}^b = d_{(i,j)}^b \\ x = \langle \cos\tilde{\theta} * i + \sin\tilde{\theta} * j \rangle \\ y = \langle -\sin\tilde{\theta} * i + \cos\tilde{\theta} * j \rangle \end{cases} \quad (12)$$

In Formula (12), $d_{(i,j)}^b$ and $\tilde{d}_{(x,y)}^b$ represent elements of an $i^{th}$ row and a $j^{th}$ column of an image matrix $D^b$ respectively, and $\tilde{D}^b$ represents an element of an $x^{th}$ row and a $y^{th}$ column.

In one embodiment of the present disclosure, the to-be-corrected image $D°$ is skewed clockwise by 8.5 degrees, and the to-be-corrected image $D°$ may also be rotated counterclockwise by 8.5 degrees after obtaining the compensation angle $\tilde{\theta}$ of 8.5 degrees.

Figure 4A:
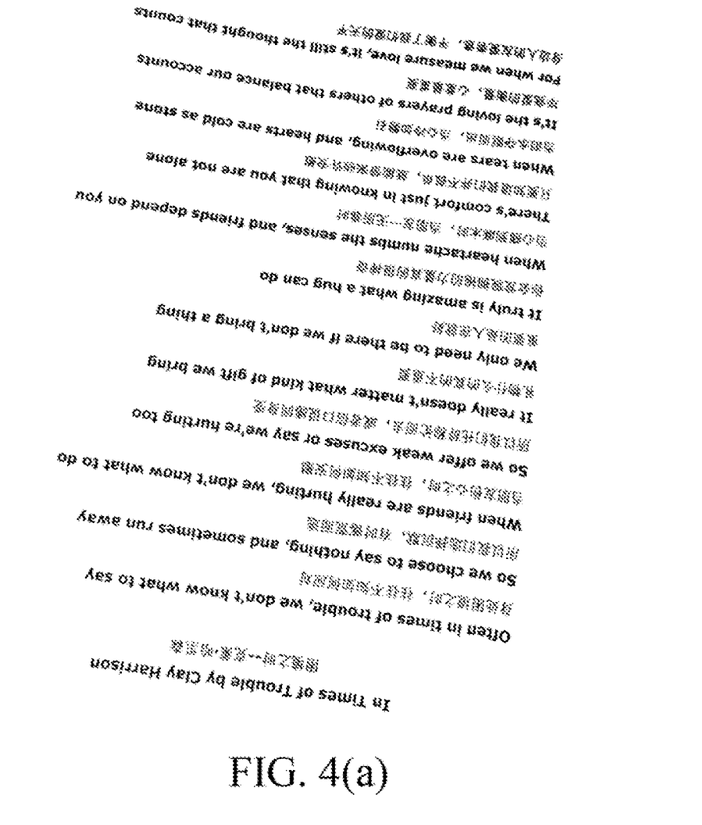
FIG. 4(a) is an example diagram of a binary image rotated by 0.5 degrees in an embodiment of the present disclosure.
Figure 4B:
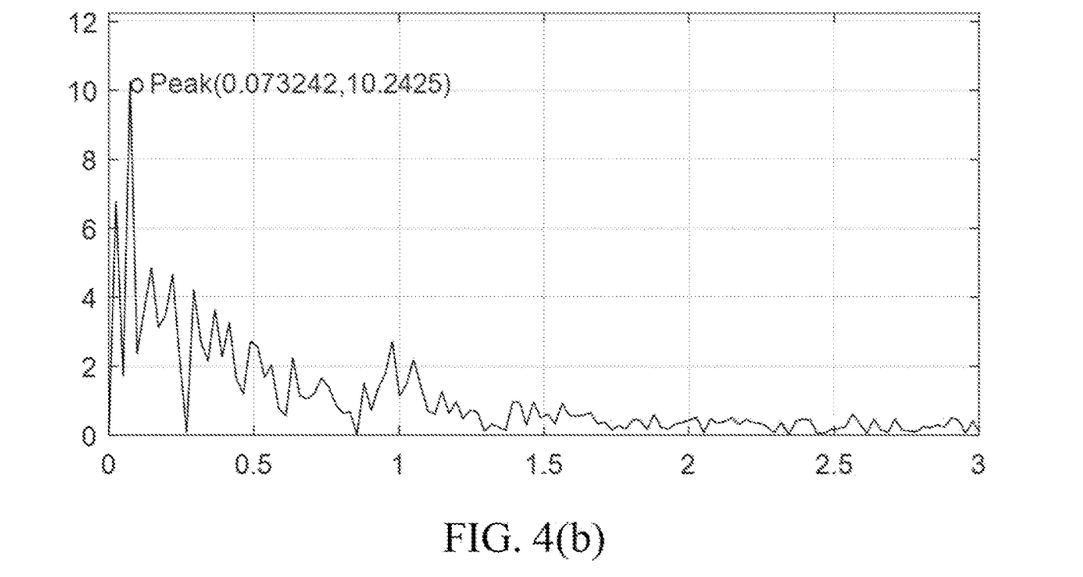
FIG. 4(b) shows a frequency analysis curve of a row cumulative variable of a binary image rotated by 0.5 degrees in an embodiment of the present disclosure.

The above technical solution is described in detail in combination with application examples as follows:

A to-be-corrected image $D°$ is obtained and converted into a binary image $D^b$. The binary image $D^b$ is skewed clockwise by 8.5 degrees. The binary image $D^b$ is rotated counterclockwise by 180 degrees with a step size of 0.5 degrees:

When the binary image $D^b$ is rotated counterclockwise by 0.5 degrees, an example diagram of the current binary image $D^t$ is shown in FIG. 4(a), and text in the current binary image $D^t$ is still skewed. A corresponding row cumulant $S^t$ is calculated for the binary image $D^t$ in which $\theta_t = 0.5$ degrees. Then, a frequency component is extracted for the row cumulant $S^t$, as shown in FIG. 4(c). Then, a corresponding output vector $F^t$ is obtained, as shown in FIG. 4(b). It can be seen that when $\theta_t = 0.5$ degrees, the highest frequency is 0.073242 Hz.

Figure 5A:
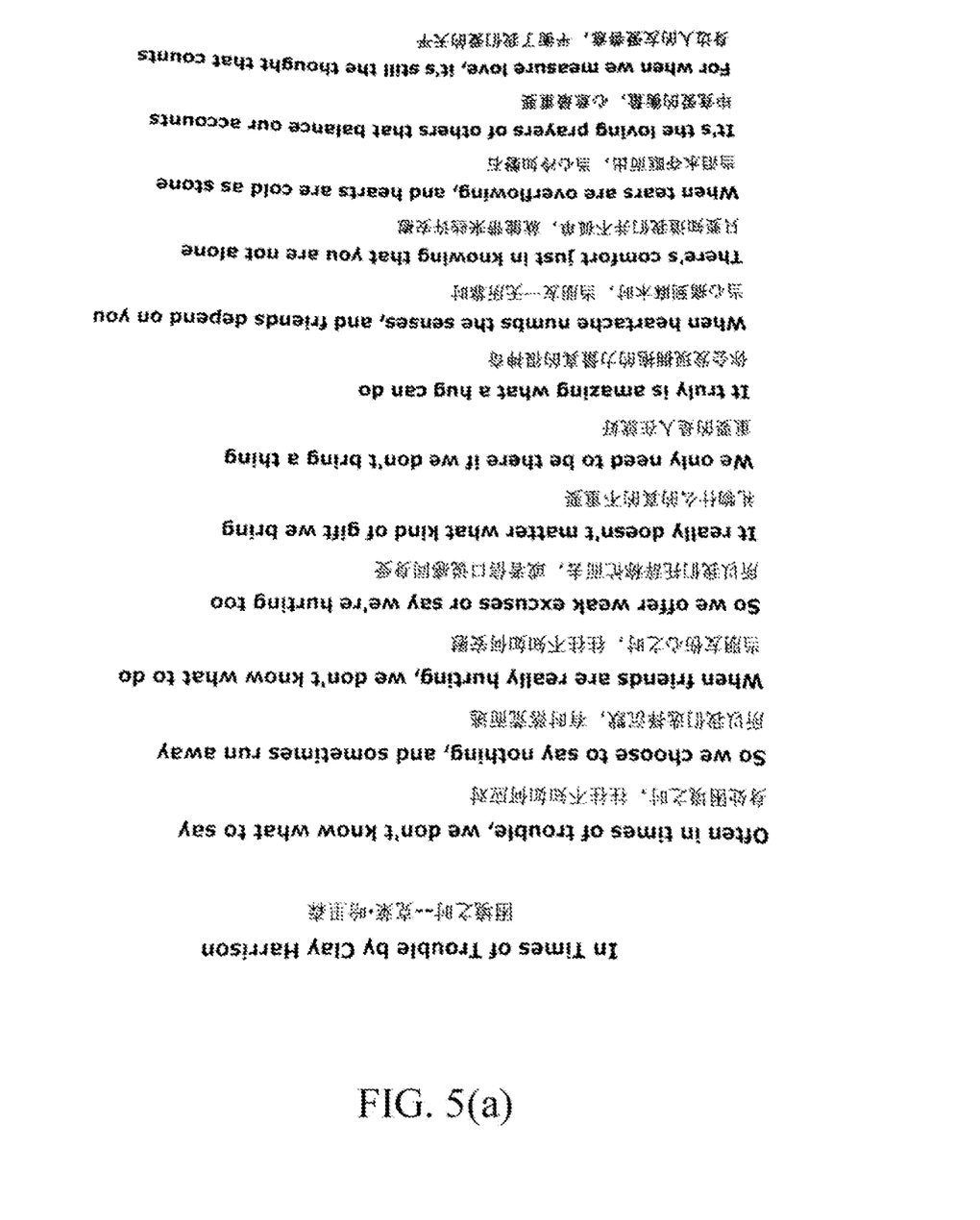
FIG. 5(a) is an example diagram of a binary image rotated by 8.5 degrees in an embodiment of the present disclosure.
Figure 5B:
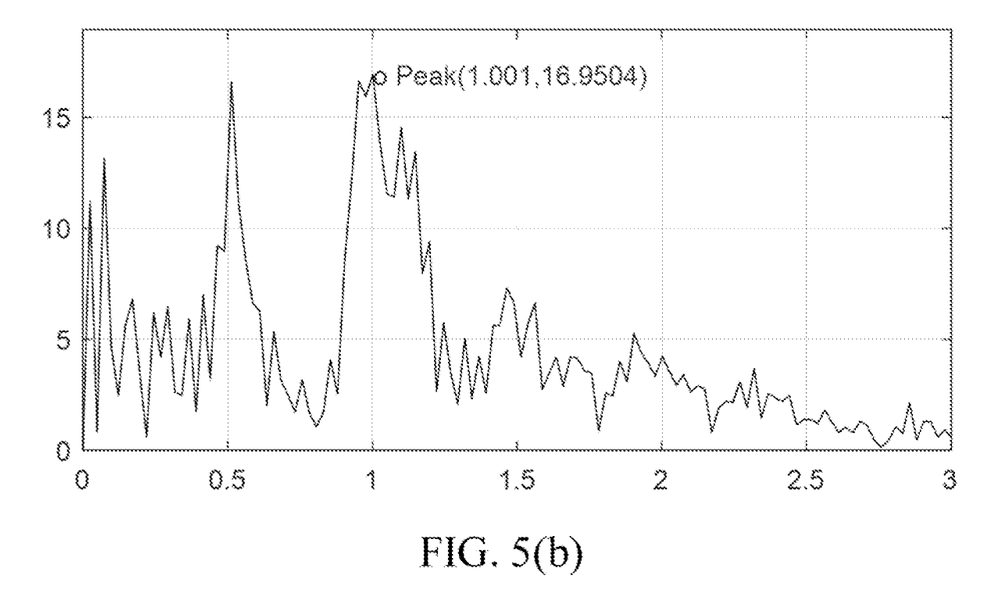
FIG. 5(b) shows a frequency analysis curve of a row cumulative variable of a binary image rotated by 8.5 degrees in an embodiment of the present disclosure.
Figure 5C:
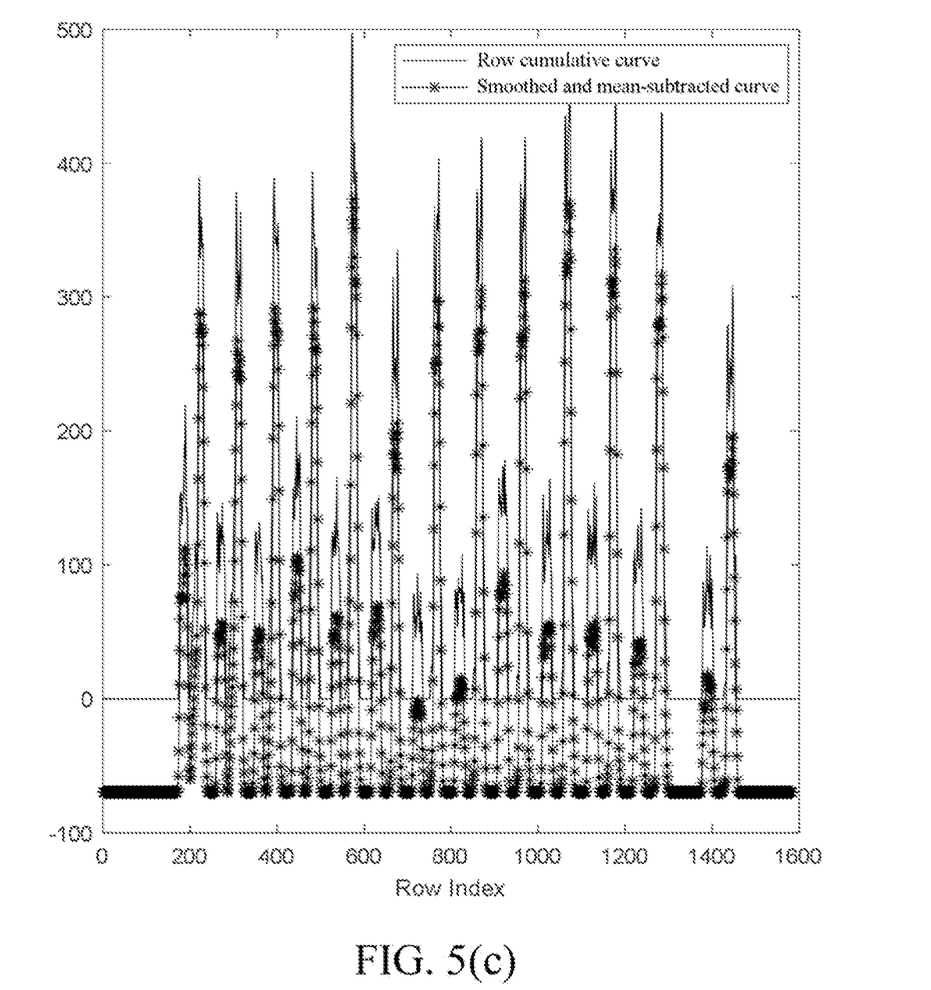
FIG. 5(c) shows a variation curve of a row cumulative variable of a binary image rotated by 8.5 degrees in an embodiment of the present disclosure.

When the binary image $D^b$ is continuously rotated counterclockwise to 8.5 degrees, an example diagram of the current binary image $D^t$ is shown in FIG. 5(a), and the text in the current binary image $D^t$ is horizontal. The corresponding row cumulant $S^t$ is calculated for the binary image $D^t$ in which $\theta_t = 8.5$ degrees. Then, the frequency component is extracted for the row cumulant S$^t$, as shown in FIG. 5(c). Then, the corresponding output vector F$^t$ is obtained, as shown in FIG. 5(b). It can be seen that when θ$_r$=8.5 degrees, the highest frequency is 1.001 Hz, which is greater than 0.073242 Hz.

Figure 6A:
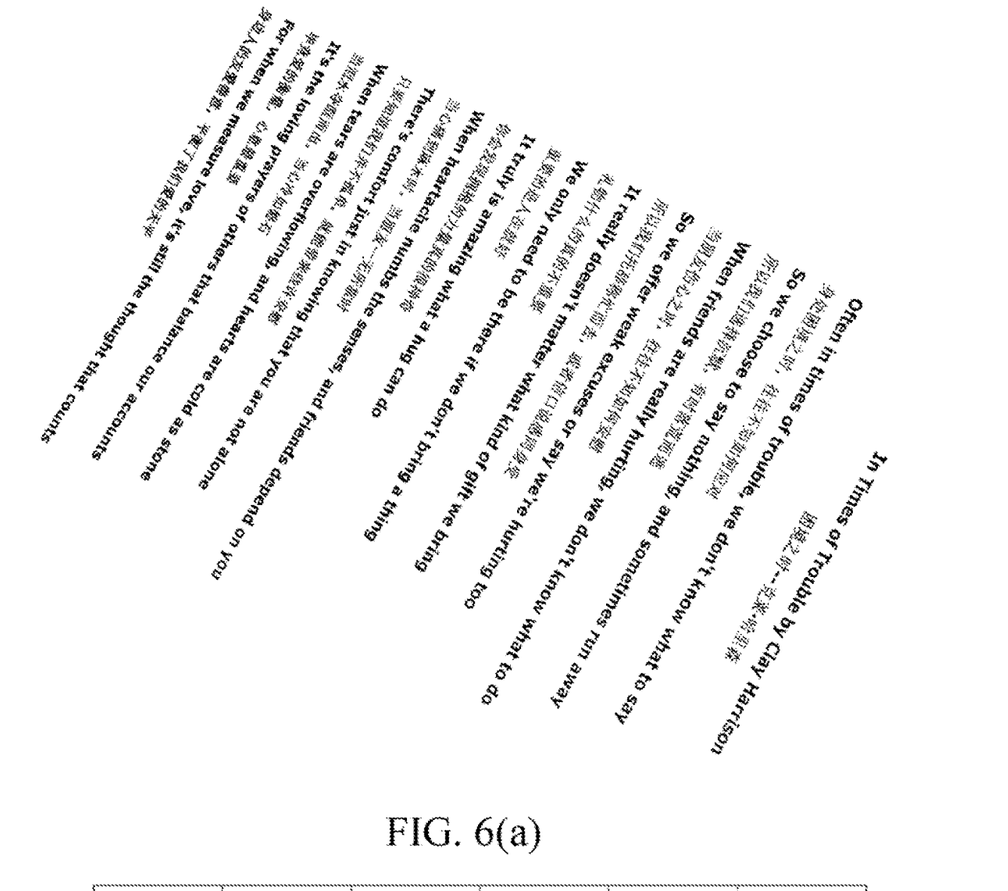
FIG. 6(a) is an example diagram of a binary image rotated by 69.5 degrees in an embodiment of the present disclosure.
Figure 6B:
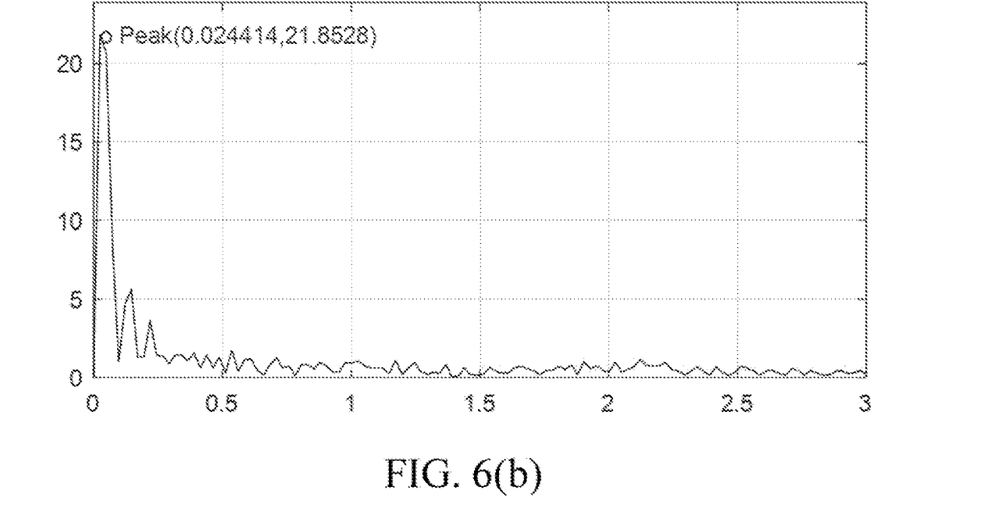
FIG. 6(b) shows a frequency analysis curve of a row cumulative variable of a binary image rotated by 69.5 degrees in an embodiment of the present disclosure.
Figure 6C:
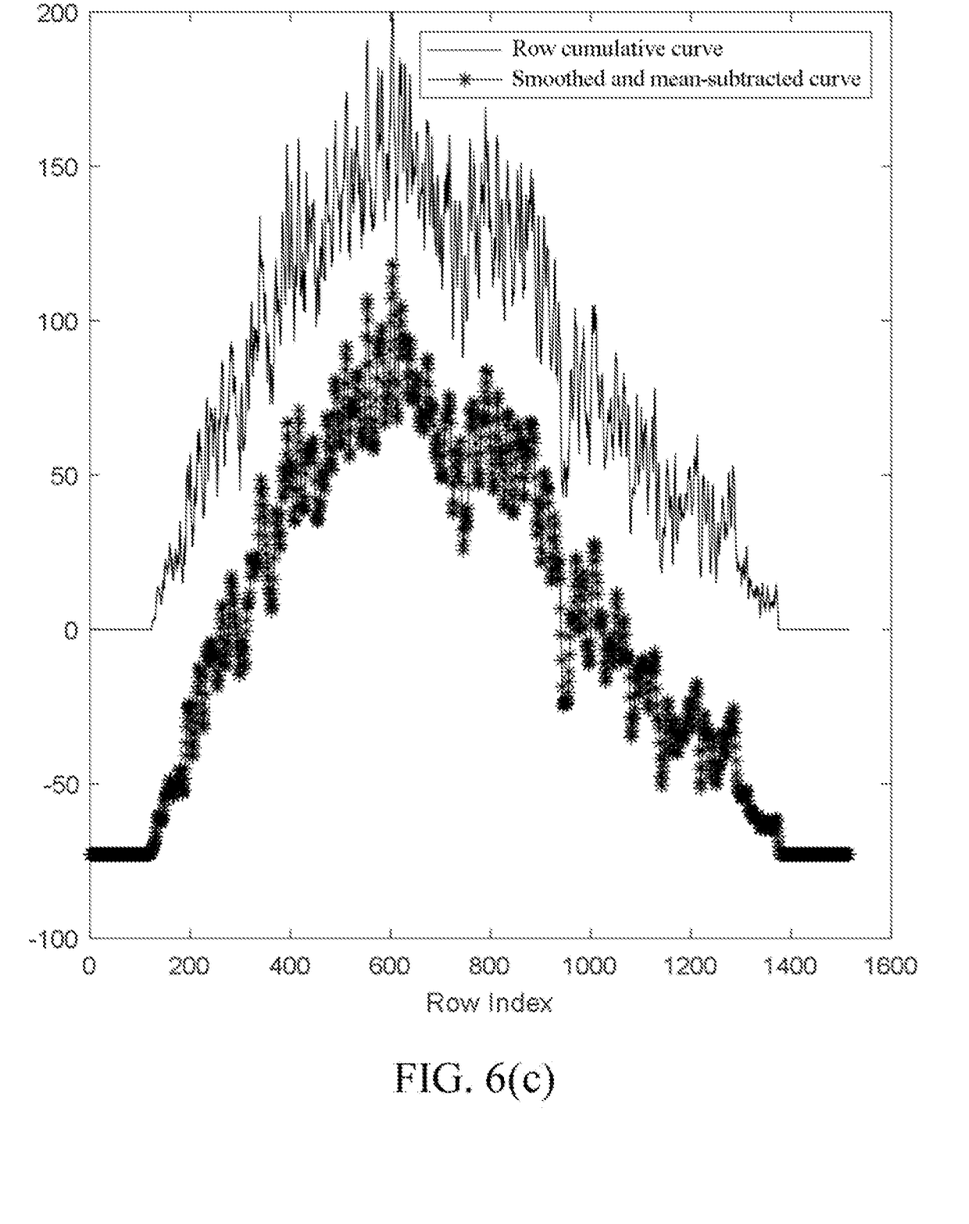
FIG. 6(c) shows a variation curve of a row cumulative variable of a binary image rotated by 69.5 degrees in an embodiment of the present disclosure.

When the binary image D$^b$ is continuously rotated counterclockwise to 69.5 degrees, an example diagram of the current binary image D$^t$ is shown in FIG. 6(a), and the text in the current binary image D$^t$ is seriously skewed. The corresponding row cumulant S$^t$ is calculated for the binary image D$^t$ in which θ$_r$=69.5 degrees. Then, the frequency component is extracted for the row cumulant S$^t$, as shown in FIG. 6(c). Then, the corresponding output vector F$^t$ is obtained, as shown in FIG. 6(b). It can be seen that when θ$_r$=69.5 degrees, the highest frequency is 0.24414 Hz which is less than 1.001 Hz.

Figure 7:
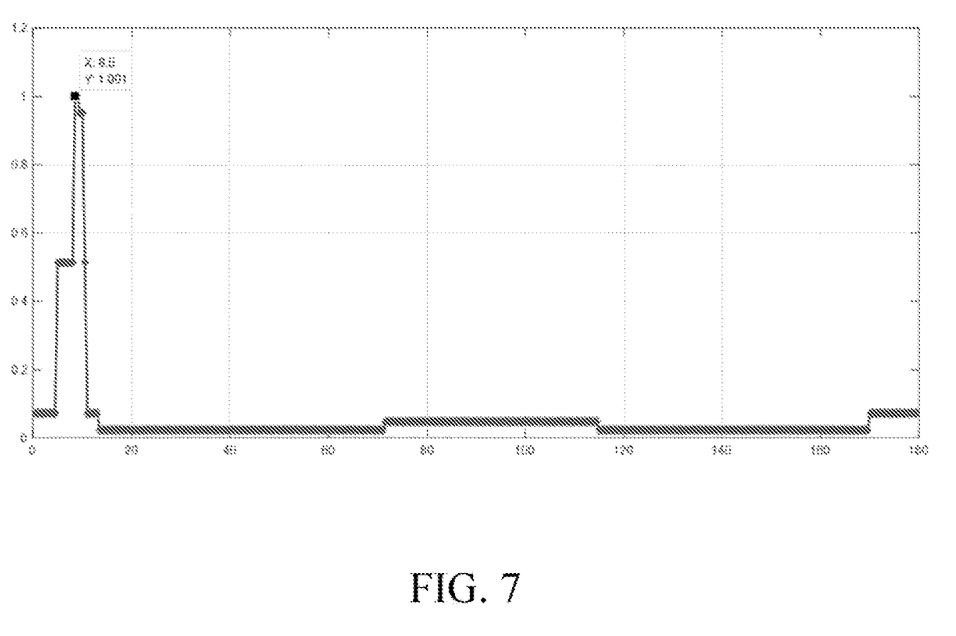
FIG. 7 shows a relationship curve between a cumulative rotation angle and a corresponding row cumulant of a binary image in an embodiment of the present disclosure.

As shown in FIG. 7, the highest point represents that θ$_r$=8.5 degrees and f=1.001 Hz. Therefore, when the rotation angle is close to or equal to a true skew compensation angle, the main contribution frequency of the row cumulative curve of the binary image is significantly increased.

It can be seen that the corresponding highest frequency is the highest among all the frequencies generated in the rotation process when the text is horizontal in the binary image D$^t$, thus verifying the rationality of the text image correction method.

Figure 8:
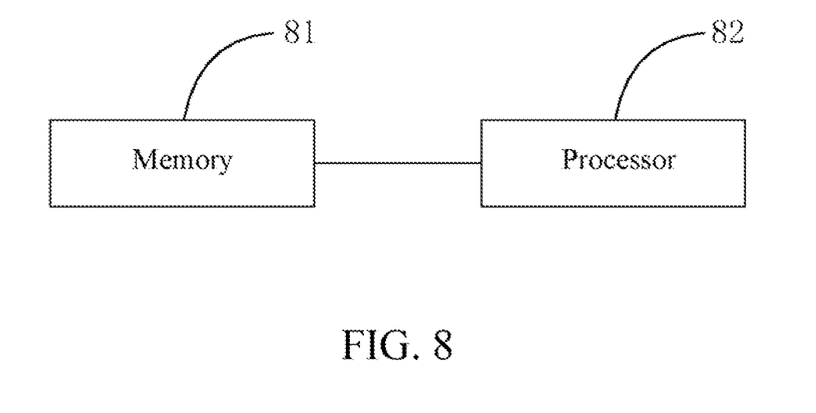
FIG. 8 is a schematic structure diagram of a text image correction apparatus according to an embodiment of the present disclosure.

In order to realize the text image correction method provided by the present disclosure, the present disclosure also provides a text image correction apparatus: As shown in FIG. 8, the text image correction apparatus includes a processor 82 and a memory 81, and may further include a communication assembly, a sensor assembly, a power assembly, a multimedia assembly, and an input/output interface as required. The memory, the communication assembly, the sensor assembly, the power assembly, the multimedia assembly, and the input/output interface are all connected to the processor 82.

In the text image correction apparatus, the processor 82 reads a computer program in the memory 81 to perform the following operations:
    preprocessing to-lie-corrected images into binary images;
    sequentially rotating the binary images in the same direction with a predetermined step size, recording a cumulative rotation angle upon each rotation, and calculating a row cumulant of a current binary image until the current binary image is rotated to a threshold angle;
    extracting a frequency satisfying preset conditions for the row cumulant of each binary image; and
    correcting the to-be-corrected images by using the cumulative rotation angle corresponding to the maximum frequency among the frequencies of the binary images satisfying the preset conditions as a compensation angle.

The text image correction method and the text image correction apparatus provided by the present disclosure may estimate the compensation angle of the skew angle more accurately, and may correct skewed text and pictures. Frequency information of a row cumulative curve used is sensitive to an error between a compensation angle of a skew angle and a true skew angle, and therefore, the robustness is excellent. The text image correction method and the text image correction apparatus may be applied to image preprocessing, automatic angle compensation for scanned text and images, automatic compensation for phone camera skew angles, and other scenarios.

The text image correction method and apparatus provided by the present disclosure are described in detail above. Any obvious change made to the present disclosure without departing from the essence of the present disclosure will constitute infringement of the patent right of the present disclosure, and those of ordinary skill in the art will bear corresponding legal responsibilities.

What is claimed is:

1. A text image correction method, comprising the following steps:
    preprocessing to-be-corrected images into binary images;
    sequentially rotating the binary images in the same direction with a predetermined step size, recording a cumulative rotation angle upon each rotation and calculating a row cumulant of a current binary image until the current binary image is rotated to a threshold angle;
    extracting a frequency satisfying preset conditions for the row cumulant of each binary image; and
    correcting the to-be-corrected images by using the cumulative rotation angle corresponding to the maximum frequency among the frequencies of the binary images satisfying the preset conditions as a compensation angle.

2. The text image correction method according to claim 1, wherein the preprocessing to-be-corrected images into binary images further comprises:
    converting the to-be-corrected images into grayscale images; and
    converting the grayscale images into the binary images based on a maximum between-class variance method.

3. The text image correction method according to claim 1, wherein the calculating a row cumulant of the current binary image further comprises:
    calculating a row cumulant of each row for the current binary image; and
    sequentially constructing the row cumulant of each row into a column vector S$^t$ as the row cumulant of the current binary image,
    a calculation formula for the row cumulant of each row being:

$$s_i^t = \Sigma_j d_{(i,j)}^t$$

wherein s$_i^t$ is a row cumulant of an i$^{th}$ row of a current binary image D$^t$, and d$_{(i,j)}^t$ is an element in the i$^{th}$ row and j$^{th}$ column of the current binary image D$^t$.

4. The text image correction method according to claim 1, wherein the extracting a frequency satisfying preset conditions for the row cumulant of each binary image further comprises:
    performing sliding window smoothing filtering on the row cumulant of the current binary image to obtain a corresponding filtering sequence Q$^t$;
    performing mean subtraction processing on t e filtering sequence Q$^t$ to obtain a corresponding mean-subtracted sequence H$^t$;
    performing spectral analysis on the mean-subtracted sequence H$^t$ to obtain a discrete sequence P$^t$; and
    extracting a frequency f$^t$ satisfying the preset conditions from the discrete sequence P$^t$.

5. The text image correction method according to claim 4, wherein a calculation formula for the filtering sequence Q$^t$ is:

$$q_i^t = \frac{1}{L} \sum_{j=0}^{L} s_{i+j}^t$$

wherein $q_i^{th}$ is an $i^{th}$ element of $Q^t$, L is a width of a sliding window, and $s_{i+j}{}^t$ is a row cumulant of an $(i+j)^{th}$ row in the current binary image $D^t$.

6. The text image correction method according to claim 5, wherein a calculation formula for the mean-subtracted sequence $H^t$ is:

$$h_i^t = q_i^t - M(Q^t)$$

wherein $h_i^t$ is an $i^{th}$ element of the mean-subtracted sequence $H^t$, and $M(*)$ represents calculation of a mean of an input sequence.

7. The text image correction method according to claim 6, wherein a calculation formula for the discrete sequence $P^t$ is:

$$p_k^t = \sum_{j=0}^{N-1} h_j^t * e^{-\frac{2\pi i}{N} kj} \quad k = 0, \ldots, N-1$$

wherein $h_j^t$ is the $i^{th}$ element of the mean-subtracted sequence $H^t$, $p_k^t$ is a $k^{th}$ element of the discrete sequence $P^t$, and N is a minimum power of 2 greater than a length of the sequence $H^t$.

8. The text image correction method according to claim 7, wherein a calculation formula for the frequency $f^t$ satisfying the preset conditions is:

$$f^t = \frac{F_s}{2N} k$$
$$\text{s.t. } p_k^t \geq \varphi^* M(P^t)$$

wherein Fs is a sampling rate of the row cumulant of the current binary image, and $\varphi$ is a configurable system parameter.

9. The text image correction method according to claim 1 wherein a calculation formula for sequentially rotating the binary images in the same direction is:

$$\begin{cases} d_{(x,y)}^t = d_{(i,j)}^b \\ x = \langle \cos\theta_t * i + \sin\theta_t * j \rangle \\ y = \langle -\sin\theta_t * i + \cos\theta_t * j \rangle \end{cases}$$

wherein $d_{(x,y)}{}^t$ is an element of a rotated binary image an $x^{th}$ row and a $y^{th}$ column, $\theta_t$ is a rotation angle of the rotated binary image, $d_{(i,j)}{}^b$ is an element of an unrotated binary image in an $i^{th}$ row and a $j^{th}$ column, and $\langle * \rangle$ represents rounding a result.

10. A text image correction apparatus, comprising: a processor and a memory, wherein the processor reads a computer program in the memory to perform the following operations:

preprocessing to-be-corrected images into binary images;

sequentially rotating the binary images in the same direction with a predetermined step size, recording a cumulative rotation angle upon each rotation, and calculating a row cumulant of a current binary image until the current binary image is rotated to a threshold angle;

extracting a frequency satisfying preset conditions for the row cumulant of each binary image; and correcting the to-be-corrected images by using the cumulative rotation angle corresponding to the maximum frequency among the frequencies of the binary images satisfying the preset conditions as a compensation angle.

* * * * *